July 3, 1945.  K. C. BUGG ET AL  2,379,786
FASTENER
Filed Oct. 2, 1943
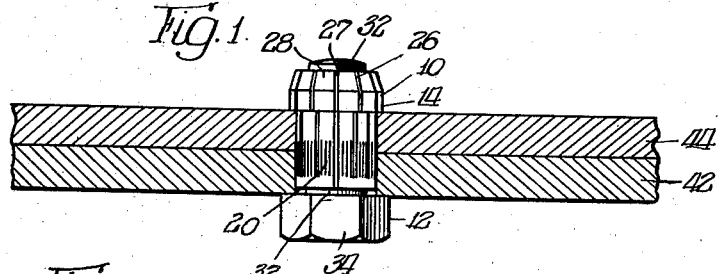
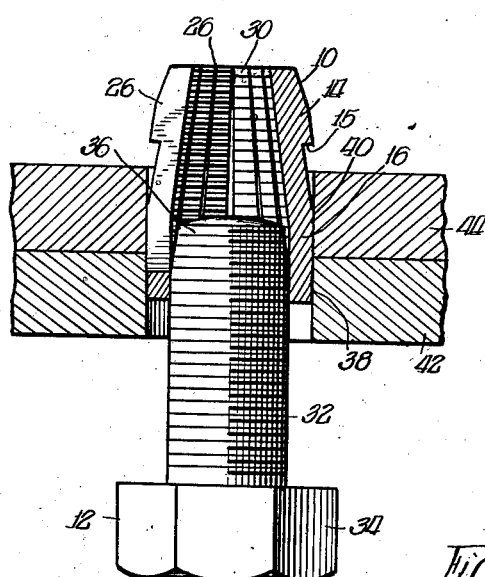
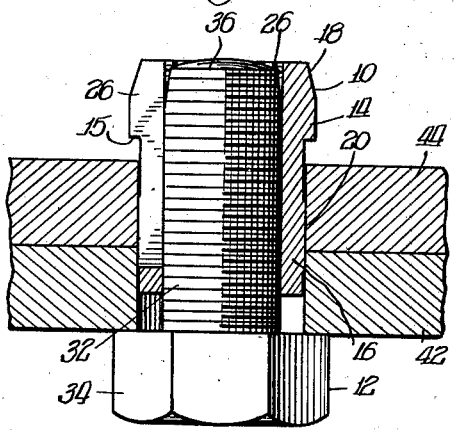
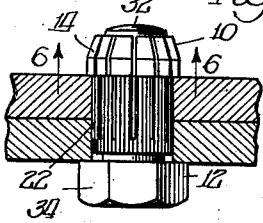
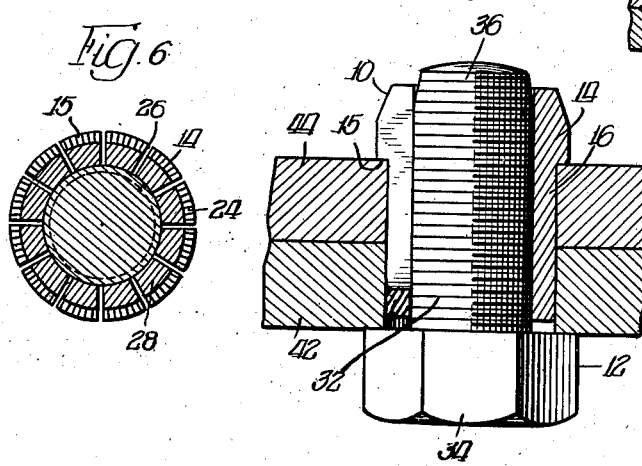
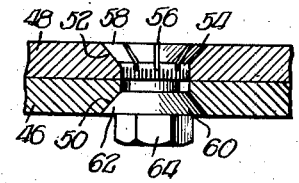
INVENTORS.
Kenly C. Bugg,
Harry L. Hart,
BY Patented July 3, 1945

2,379,786

UNITED STATES PATENT OFFICE 2,379,786

FASTENER

Kenly C. Bugg and Harry L. Hart, Fort Wayne, Ind.; said Hart assignor to said Bugg Application October 2, 1943, Serial No. 504,670

7 Claims. (Cl. 85—40)

This invention pertains to a fastener, and more particularly to a threaded expanding and securing means assembly, wherein the tensioning thereof is controllable.

It is an object of the invention to provide a fastener, insertable and set cold from one side of juxtaposed members to be secured together, the fastener being adapted to dowel and fill the holes through which it extends.

Another object of the invention is to provide a fastener which is adapted to be insertable from one side of a plurality of objects to be secured together and settable from the side from which it is inserted, the setting thereof causing the fastener to expand the holes through which it extends.

Another object of the invention is to provide a fastener so constructed and arranged as to interlock with the materials which it is adapted to secure together.

Another object of the invention is to provide a fastener which is readily adapted for fabrication in any reasonable size, but which is settable by conventional tools such as a wrench or screw driver—in other words, special setting tools are not necessary.

Another object of the invention is to provide a fastener comprising a plurality of parts, but adapted to be insertable and settable from one side of objects to be secured together, the setting of the fastener to fully fastened position, causing the parts thereof to be self-locking so that it is impossible for them to be accidentally loosened.

Another object of the invention is to provide a fastener wherein there is no upsetting of the fastener during and after setting.

Another object of the invention is to provide a fastener which is adapted to be set cold, whereby it is assured that the holes of the objects connected are completely filled and evenly expanded, thus insuring that there is no contracting of the fastener which would leave a loose shank after setting, such as is apt to occur when a heated rivet is used.

Another object of the invention is to provide a fastener which, when set, is substantially splined to the objects connected whereby there can be no relative movement between said objects after connection.

Another object of the invention is to provide a fastener which is adapted to be secured cold and wherein the fastener can be conveniently made of the same material as the objects connected, thus preventing oxidation.

Another object of the invention is to provide a fastener comprising a plurality of parts, one of which is adapted to be rotated to setting condition, the other of which is maintained stationary by the objects or one of them to be connected together by the fastener, whereby only a single tool is necessary to set the fastener.

With these and various other objects in view, the invention may consist of certain novel features of construction and operation, as will be more fully described and particularly pointed out in the specification, drawing and claims appended hereto.

In the drawing, which illustrates embodiments of the device and wherein like reference characters are used to designate like parts—

Figure 1 is a fragmentary sectional elevation of a pair of members (shown and hereinafter referred to as plates) to be secured together by a fastener embodying the invention, the fastener being shown in fully set or fastened condition.

Figure 2 is an enlarged fragmentary sectional elevation through plates to be secured together and a fastener embodying the invention, the fastener being shown in position prior to setting, but just after being inserted through the aligned holes of the plates, the fastener having been inserted from one side, namely from the bottom of said figure.

Figure 3 is a sectional elevation corresponding to Figure 2, showing the fastener being operated toward fastened or set condition.

Figure 4 is an enlarged sectional elevation corresponding to Figure 3, showing the fastener in fully set or fastened condition.

Figure 5 is a sectional elevation corresponding to Figure 1, showing a modified form of the fastener embodying the invention.

Figure 6 is an enlarged sectional plan view of the head of a modified form of fastener embodying the invention, the same being taken substantially in the plane as shown by the line 6—6 of Figure 5.

Figure 7 is a sectional elevation corresponding to Figure 1, showing yet another modified form of fastener embodying the invention.

Referring first of all more particularly to the form of device illustrated in Figures 1 to 6 inclusive, the fastener comprises an outer expanding barrel or sleeve 10, and a setting or locking member 12. The sleeve 10 is provided with the head 14 defined by the plate engaging shoulder 15, and the shank 16. In the form shown, inasmuch as the fastener is to be inserted through a round hole, the head and shank are cylindrical. Of course, any other shape might be used, depending upon the hole through which it is to be inserted.

The head 14 is shown as chamfered or bevelled as at 18 for easy insertion of the fastener through the holes of the articles to be secured, though this may not be necessary. The shank 16 is serrated as at 20, the serrations in effect forming keys whereby the sleeve is non-rotatably disposed with respect to the plates to be secured. In the device illustrated in Figures 1 to 4 the serrations 20 only extend part way of the shank, whereas the serrations 22 of the device illustrated in Figure 5 extend substantially the entire length of the shank, and in the device illustrated in Figure 6, serrations 24 are provided on the under-side of the head 14 (i. e. on shoulder 15), whereby in set position the serrations bite into the face of the adjacent plate secured.

In forming the sleeve 10, the cylindrical shank 16 is initially formed with a slightly greater external diameter than the hole through which it is to be inserted. The sleeve is provided with the head 14 and the head and shank 16 are slotted as at 26, the slots 26 extending to a point adjacent the base of the shank 16 and one of said slots 27 (Figure 1) may extend the full length of the sleeve whereby the sleeve may be more readily contracted during insertion. By so slotting, in effect, fingers 28 are formed and the number of fingers is determined by the shear to be attained coupled with the deflection necessary for insertion. These fingers, including the head 14, are bent or deflected inwardly toward the axis of the fastener as illustrated in Figure 2.

The inside of the sleeve is threaded as at 30 for reception of the threaded shank 32 of the locking member 12 in the form shown in Figures 1 to 6 inclusive, the member comprising said shank 32 and the head 34, it being understood, of course, that any form of head may be used; but for convenience of illustration, the form of head illustrated is adapted to be operated by a conventional wrench. The upper end of the shank 32 may be tapered as at 36 in order that the fastener may be more readily operated in initially spreading fingers 28.

In order that it may be inserted through the aligned apertures 38 and 40 of the plates (or other articles) 42 and 44 to be secured together the fastener prior to insertion is in condition where the barrel is in collapsed position such as shown in Figure 2, i. e. the fingers 28 are deflected inwardly. The barrel is then inserted through the apertures 38 and 40 to the position illustrated in Figure 2 and during insertion the lower part of the serrations 20 and 22 (i. e., those on the undeflected part of the barrel) will bite into the adjacent metal. The setting member 12 is then rotated, causing the shank 32 to move upwardly from the position shown in Figure 2 to the position as illustrated in Figure 3, thereby causing the fingers to be slightly spread to a position wherein the shoulder 15 overhangs the member 44. In fully expanded position the holes will actually be slightly spread thus insuring a tight joint and a firm connection.

Continued rotation of the setting member 12 will cause the sleeve to be pulled downwardly to a position where the shoulder 15 tightly engages the adjacent plate, and the underside of the head 34 will engage its adjacent plate. The fastener is then tightened as much as possible, this fully set position being shown in Figure 4. In this position, where the serrations 24 (Figure 6) are used, they of course will bite into the adjacent plate 44. In fully set position inasmuch as the fingers have spread, the complementary threads in effect form locking means preventing accidental relative movement between the parts.

In the form of device illustrated in Figure 7, the plates 46 and 48 are counter-sunk as at 50 and 52. The sleeve 54 is similar to the sleeve 10, being slotted as at 56 and internally threaded, but the head 58 thereof is a counter-sunk head. The locking member 60 is also provided with a portion 62 so that it may be counter-sunk in hole 50, and means 64 shown as a hex head, is provided for rotation of the locking member. While the hex head is illustrated, it is of course understood that the locking member may be slotted for the reception of a screw driver, or other means may be provided for rotating the locking member. After the fastener is set in the same manner as already described, the means 64 may then be cut off, providing a flush surface. Further it is appreciated that the underside of the head 58 as well as the shank of the sleeve may be serrated, as has already been described with respect to Figures 1 to 6 inclusive, and one of the slits may extend the complete length of the sleeve, similar to slit 27.

While plates are shown as connected, it is understood that other objects may be connected and it is further understood that we do not wish to be limited by the exact embodiments of the device shown, which are merely by way of illustration and not limitation, as various and other forms of the device will, of course, be apparent to those skilled in the art without departing from the spirit of the invention or the scope of the claims.

We claim:

1. A fastener comprising a locking member and a sleeve, said sleeve having a shank and head shaped for countersinking, the head and a portion of the shank being slit to form fingers adapted to be biased inwardly to a position where the diameter of the head is no greater than the diameter of the shank when the fingers are in unbiased condition, the locking member having a head shaped for countersinking, and a threaded shank, the threaded shank being adapted to extend within said sleeve shank and to engage complementary threads therein, whereby movement of the locking member axially of said sleeve will cause the heads to approach each other causing the fingers to be bent outwardly, said head of said locking member having means for moving said head, said means comprising a projection adapted to be removed after the fastener is set.

2. A fastener adapted to be inserted through aligned apertures of members to be secured together, comprising a locking member and a sleeve, said sleeve having a head and an internally threaded shank, said shank being adapted to lie entirely within said apertures, said head being provided with a shoulder adapted to be moved to engage one of the first named members, the diameter of said shank being substantially that of the diameter of the aligned apertures, said head being slitted and said shank being partially slitted to form fingers, said fingers being normally biased inwardly to a position where the diameter of the head and shoulder is no greater than the diameter of the shank when the fingers are in unbiased condition whereby the head is insertable through said aligned apertures, the locking member having a head and a shank tapered adjacent its free end, but conforming to the internal diameter of the sleeve for the remainder of its length, the threaded shank being adapted to extend within the sleeve shank and adapted to engage complementary threads therein, movement of the locking member axially of said sleeve causing the heads to approach each other into fastening relation with said first named members and causing said fingers to be bent outwardly whereby the shoulder of said first named head is adapted to overlie said first named members.

3. A fastener adapted to be inserted through aligned apertures of members to be secured together, comprising a locking member and a sleeve, said sleeve having a head and an internally threaded shank, said shank being adapted to lie entirely within said apertures, said head being provided with a shoulder adapted to be moved to engage one of the first named members, the diameter of said shank being substantially that of the diameter of the aligned apertures, said head being slitted and said shank being partially slitted to form fingers, one of said slits extending the complete length of said sleeve, said fingers being normally biased inwardly to a position whereby the diameter of the head and shoulder is no greater than the diameter of the shank when the fingers are in unbiased condition whereby the head is insertable through said aligned apertures, the locking member having a head and a shank, said last named shank having an external diameter substantially equal to the largest internal diameter of the sleeve, the threaded shank being adapted to extend within the sleeve shank and adapted to engage complementary threads therein, movement of the locking member axially of said sleeve causing the heads to approach each other into fastening relation with said first named members and causing said fingers to be bent outwardly whereby the shoulder of said first named head is adapted to overlie said first named members.

4. A fastener adapted to be inserted through aligned apertures of members to be secured together, comprising a locking member and a sleeve, said sleeve having a head and an internally threaded shank, said shank being adapted to lie entirely within said apertures, said head being provided with a shoulder adapted to be moved to engage one of the first named members, the diameter of said shank being substantially that of the diameter of the aligned apertures, said head being slitted and said shank being partially slitted to form fingers, said fingers being normally biased inwardly to a position where the diameter of the head and shoulder is no greater than the diameter of the shank when the fingers are in unbiased condition whereby the head is insertable through said aligned apertures, the locking member having a head and a shank, said last named shank having an external diameter substantially equal to the largest internal diameter of the sleeve, the threaded shank being adapted to extend within the sleeve shank and adapted to engage complementary threads therein, movement of the locking member axially of said sleeve causing the heads to approach each other into fastening relation with said first named members and causing said fingers to be bent outwardly whereby the shoulder of said first named head is adapted to overlie said first named members.

5. A sleeve for a fastener, comprising a head and an internally threaded shank, said shank being adapted to lie entirely within the apertures of members to be connected, said head being provided with a shoulder adapted to be moved by the fastener to engage one of the members to be connected, the diameter of said shank being substantially that of the diameter of the aligned apertures, said head being slitted and the shank partially slitted to form fingers, said fingers being normally biased inwardly to a position where the diameter of the head and shoulder is no greater than the diameter of the shank when the fingers are in unbiased condition.

6. A sleeve for a fastener, comprising a head and an internally threaded shank, said shank being adapted to lie entirely within the apertures of members to be connected, said head being provided with a shoulder adapted to be moved by the fastener to engage one of the members to be connected, the diameter of said shank being substantially that of the diameter of the aligned apertures, said head being slitted and the shank partially slitted to form fingers, said fingers being normally biased inwardly to a position where the diameter of the head and shoulder is no greater than the diameter of the shank when the fingers are in unbiased condition, said sleeve having knurled portions thereon to prevent turning of the sleeve in use.

7. A fastener adapted to be inserted through aligned apertures of members to be secured together, comprising a locking member and a sleeve, said sleeve having a head and an internally threaded shank, said shank being adapted to lie entirely within said apertures, said head being provided with a shoulder adapted to be moved to engage one of the first named members, the diameter of said shank being substantially that of the diameter of the aligned apertures, said head being slitted and said shank being partially slitted to form fingers, said fingers being normally biased inwardly to a position where the diameter of the head and shoulder is no greater than the diameter of the shank when the fingers are in unbiased condition whereby the head is insertable through said aligned apertures, the locking member having a head and a shank, said last named shank having an external diameter substantially equal to the largest internal diameter of the sleeve, the threaded shank being adapted to extend within the sleeve shank and adapted to engage complementary threads therein, movement of the locking member axially of said sleeve causing the heads to approach each other into fastening relation with said first named members and causing said fingers to be bent outwardly whereby the shoulder of said first named head is adapted to overlie said first named members, said sleeve being knurled to engage the first named members within the apertures to prevent the sleeve from turning when the locking member is being moved to cause said heads to approach each other.

KENLY C. BUGG.
HARRY L. HART.